(12) United States Patent
Koss

(10) Patent No.: US 8,140,541 B2
(45) Date of Patent: Mar. 20, 2012

(54) TIME-WEIGHTED SCORING SYSTEM AND METHOD

(75) Inventor: Michael Campbell Koss, Seattle, WA (US)

(73) Assignee: Michael Campbell Koss, Seattle, WA (US)

( * ) Notice: Subject to any disclaimer, the term of this patent is extended or adjusted under 35 U.S.C. 154(b) by 349 days.

(21) Appl. No.: 12/571,130

(22) Filed: Sep. 30, 2009

(65) Prior Publication Data

US 2011/0078156 A1 Mar. 31, 2011

(51) Int. Cl.
*G06F 7/00* (2006.01)
*G03F 17/30* (2006.01)
(52) U.S. Cl. ........................................ 707/748; 707/749
(58) Field of Classification Search .................. 707/627, 707/723, 727, 730, 748–754
See application file for complete search history.

(56) References Cited

U.S. PATENT DOCUMENTS

| 6,839,680 B1* | 1/2005 | Liu et al. ....................... 705/7.33 |
| 2007/0162511 A1* | 7/2007 | Venkatesan et al. .......... 707/200 |
| 2010/0113162 A1* | 5/2010 | Vemuri et al. .................. 463/42 |

OTHER PUBLICATIONS

Dover, Danny, Reddit, Stumbleupon, Del.icio.us and Hacker News Algorithms Exposed!, SEOmoz Blog, Jul. 2, 2008. http://www.seomoz.org/blog/reddit-stumbleupon-delicious-and-hacker-news-algorithms-exposed.
Hacker News, Reddit's Ranking Algorithm. http://news.ycombinator.com/item?id=231168.

* cited by examiner

*Primary Examiner* — Usmaan Saeed
*Assistant Examiner* — Reza Hosseini
(74) *Attorney, Agent, or Firm* — ÆON Law; Adam L. K. Philipp

(57) ABSTRACT

A time-weighted score accumulation system and method are provided herein.

20 Claims, 12 Drawing Sheets

TIME-WEIGHTED SCORING SYSTEM AND METHOD

FIELD

The present disclosure relates to information processing, and more particularly to a system and method for maintaining a list of entities ordered by cumulative time-weighted scores.

BACKGROUND

Various systems need to calculate relative popularity and/or relevance according to sequences of events that occur throughout time over a population of entities to which these events are assigned. In general scores (or weights) are assigned to distinct events, and the scores accumulate over time to derive a net score for an entity. The accumulated net scores can be used to determine the relative popularity and/or relevance of the scored entities.

For example, an information processing system may track a collection of news stories (entities). In this example, scoring events may consist of users selecting headlines to read, rating the quality of the news story based on interestingness and/or relevance, and/or recommending the news story to others. Each scoring event can be assigned a weighted score (e.g., selecting a story to read can have a score of 1.0, while recommending the story to another may have a score of 3.0). If each event is assigned a numerical score, the entities accumulate a net score based on all past scoring events.

One problem with simply adding up all event scores is that the element of time is not taken into account. A news story may exist in the system for a period of days, months, or years. A story (entity) that was interesting or "news" today ceases to be so tomorrow. Thus, it may be desirable to adjust the event scores such that recent events are weighted more highly than past events.

One approach is to simply add up accumulated event scores, but to periodically "depreciate" the accumulated scores stored at specified time intervals. For example, once per day, a system might discount all scores such that scores recorded the next day would weight more heavily than past events. However, this approach requires the information system to read and modify each score each day, an approach that may be quite computationally expensive for large systems. In some cases, a system can mitigate this disadvantage to some extent by deleting or expiring older entities from the system. However, such systems cannot track surges in popularity that occur after the expiration date of an entity.

Another approach is to keep a record of all recent scoring events, ordered by time. Periodically (e.g., nightly), net scores can be recalculated based on accumulating just the scores from the most recent time interval. However, it may also be computationally expensive to process all scoring events (or even a summary of recent scoring events) until the event information can be discarded or ignored (after a system-defined maximum age).

DESCRIPTION

Figure 1:
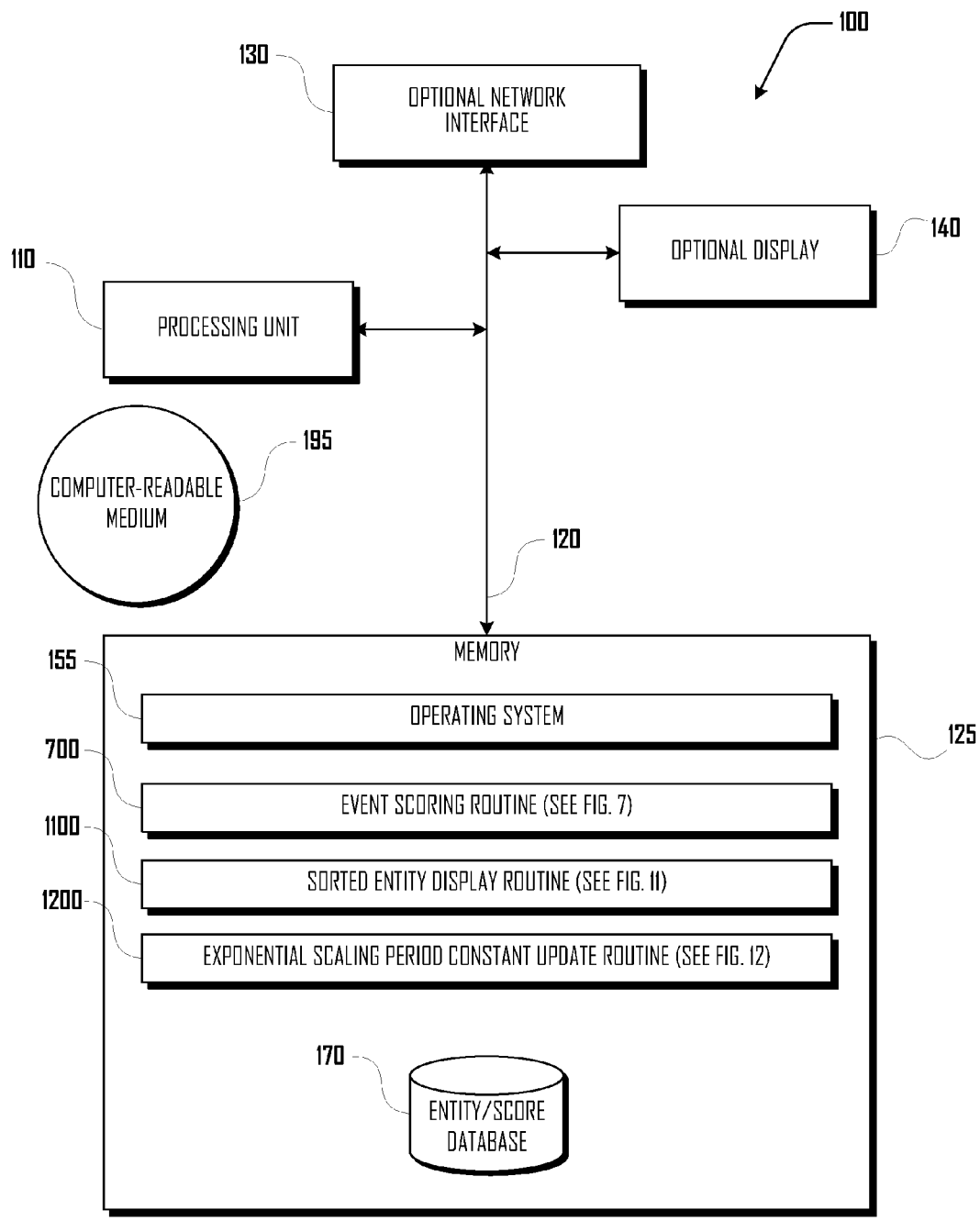
FIG. 1 is a system diagram illustrating several components of an exemplary computing system in accordance with one embodiment.

The detailed description that follows is represented largely in terms of processes and symbolic representations of operations by conventional computer components, including a processor, memory storage devices for the processor, connected display devices, and input devices. Furthermore, these processes and operations may utilize conventional computer components in a heterogeneous distributed computing environment, including remote file Servers, computer Servers and memory storage devices. Each of these conventional distributed computing components is accessible by the processor via a communication network.

Various embodiments may define a baseline time ("$t_0$") (the earliest time at which an event can occur), and calculate scores for each entity relative to $t_0$. An "inflation" model may then be used to increase the weights that are applied to individual events, so that an event occurring today, is given a higher relative weight to the same event occurring in the past. Equivalently, a "deflation" or "decay" model may be used to decrease the relative weights of events occurring in the past compared to an event at the current time.

Because all entities have a stored score relative to $t_0$, scores relative to $t_0$ are considered to be "temporally-globalized" in that any two scores relative to $t_0$ may be directly compared to one another. By contrast, scores relative to any time other than $t_0$ are considered to be "temporally-localized." For example, a score relative to a time three units later than $t_0$ ("$t_3$") may be directly compared only to other scores relative to $t_3$. In some embodiments, it may be desirable to use temporally-globalized score values to maintain order within a sorted list, but to display score values that are temporally-localized to the observation time. As discussed below, it is possible to convert a temporally-localized score value to and from a temporally-globalized score value.

In this approach, entities that are no longer receiving scoring events need not be read or updated, yet their scores can be compared against more active entities to determine which are the most popular or relevant. This approach may be desirable because many database systems provide a method of efficiently retrieving values ordered according to a value of an attribute of an entity (e.g., Indexed Sequential Access Method "ISAM" databases, Structured Query Language "SQL" based indexes, Google App Engine datastore indexes, and the like). There are numerous data storage systems that maintain ordered records and/or data structures according to a numerical value associated with each record and/or data structure. For example, a data storage system may maintain ordered records in an in-memory heap or an offline B-Tree. In such systems, entities can be efficiently stored and retrieved, while embodiments as disclosed herein may efficiently update individual entities without the need to bulk-process all the entities in the storage system to maintain entity ordering.

As discussed above, in some embodiments, it may be desirable to apply an exponentially increasing weighting factor to event scores. Exponential growth valuations are common in financial calculations (e.g., compound interest and Net Present Value calculations). A baseline time is chosen, and assigned a weight of one. Future weights are calculated as an exponentially increasing function of time.

One difficulty of processing values that grow exponentially is that the required storage for values increases linearly over time (or exceeds the available space allocated to store each value, e.g., if using a floating point numeric representation).

To address this concern, one embodiment stores the logarithm of the score, rather than the score itself. Since logarithms are monotonically increasing functions, a value, $V_1$, that is greater than another, $V_2$, will have a logarithm $\log(V_1)$, that is greater than the logarithm, $log(V_2)$ of the other value, i.e. for all values $V_1, V_2 > 0$:

$$V_1 > V_2 \textit{ iff } \log(V_1) > \log(V_2) \quad \text{EQUATION 1}$$

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 illustrates several components of an exemplary computing system 100 in accordance with one embodiment. In some embodiments, computing system 100 may include many more components than those shown in FIG. 1. However, it is not necessary that all of these generally conventional components be shown in order to disclose an illustrative embodiment. As shown in FIG. 1, computing system 100 includes an optional network interface 130 for connecting to a network (not shown). Network interface 130 includes the necessary circuitry for such a connection and is constructed for use with an appropriate protocol.

Computing system 100 also includes a processing unit 110, a memory 125, and an optional display 140, all interconnected, along with optional network interface 130, via bus 120. Memory 125 generally comprises a random access memory ("RAM"), a read only memory ("ROM"), one or more permanent mass storage devices, such as a disk drive, and/or a storage service operated by a distributed storage provider. In some embodiments, memory 125 may also comprise a local and/or remote database, database server, and/or database service. Similarly, processing unit 110 may be composed of numerous physical processors and/or it may comprise a service operated by a distributed processing facility.

Figure 7:
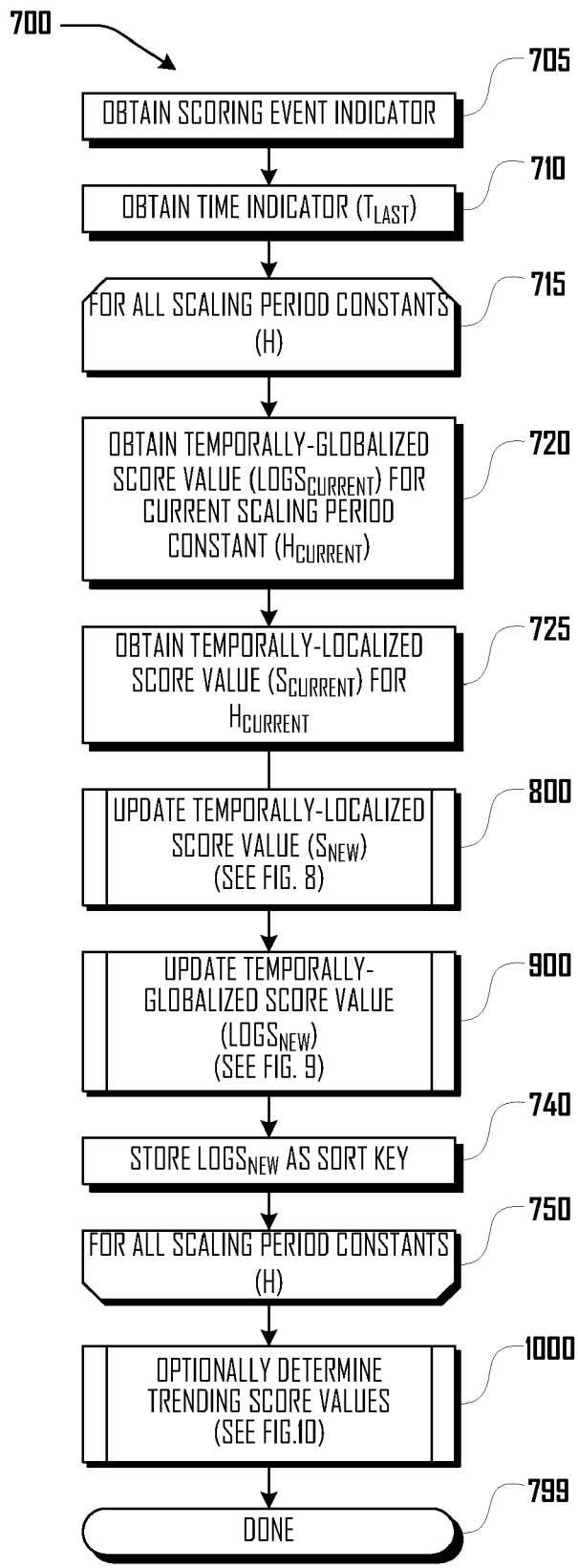
FIG. 7 is a flow diagram illustrating an event scoring routine in accordance with one embodiment.

Memory 125 stores program code for some or all of an event scoring routine 700, as illustrated in FIG. 7 and discussed below; a sorted entity display routine 1100, illustrated in FIG. 11 and discussed below; and an exponential scaling period constant update routine 1200, illustrated in FIG. 12 and discussed below. These and other software components may be loaded from a computer readable storage medium 195 into memory 125 of device 100 using a drive mechanism (not shown) associated with the computer readable storage medium 195, such as a floppy disc, tape, DVD/CD-ROM drive, memory card. In some embodiments, software components may also be loaded via the network interface 130 or other non-storage media. Memory 125 may also contain an entity/score database 170 or other data store.

In some embodiments, computing system 100 may comprise one or more devices such as that illustrated in FIG. 1. In other embodiments, computing system 100 may comprise one or more virtualized servers, web services, and/or other computing devices.

Figure 2:
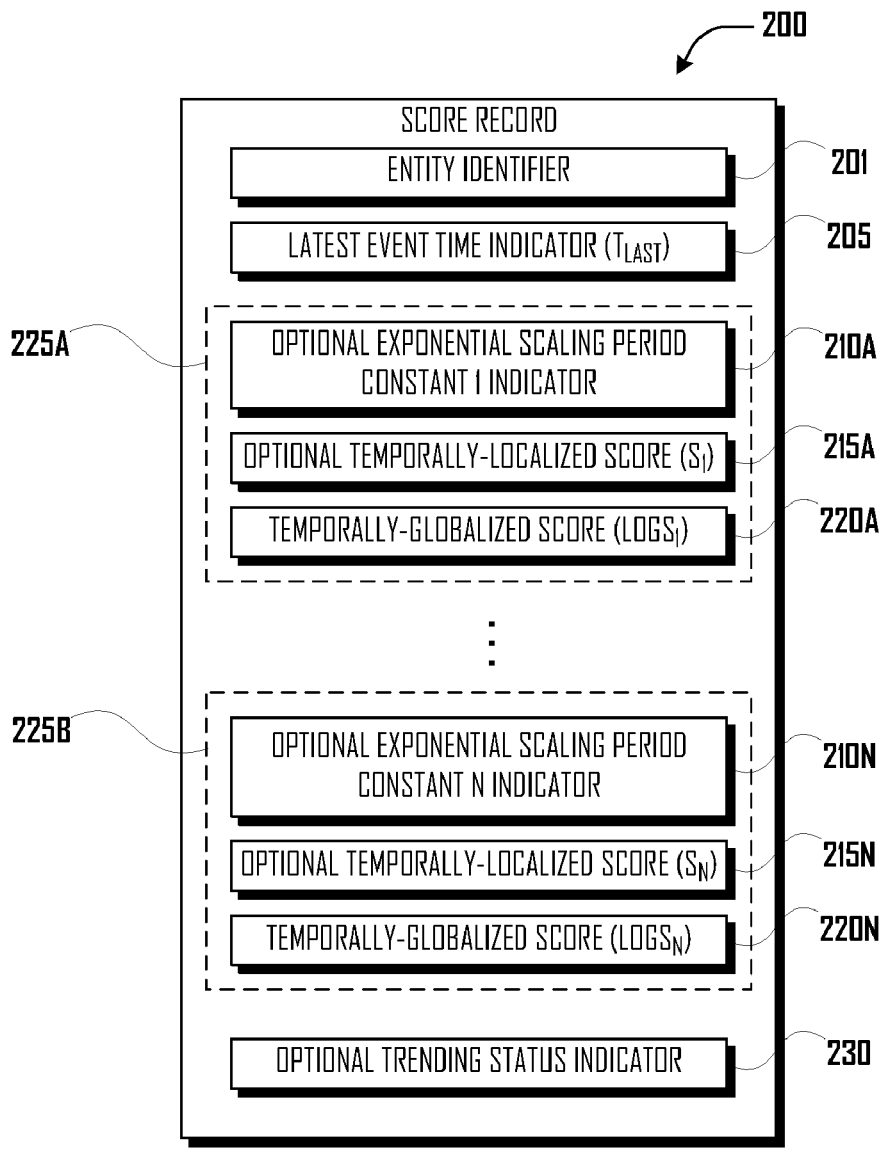
FIG. 2 is a diagram illustrating an exemplary score record in accordance with one embodiment.

FIG. 2 illustrates an exemplary score record 200 in accordance with one embodiment. The exemplary score record 200 includes an entity identifier 201, which associates the record 200 with a particular entity. In various embodiments, score records may be associated with entities such as a web page, a person and/or user account, a tag, and the like. The entity identifier may take various forms, as appropriate to the type of entity for which the score is being tracked. For example, when the associated entity is a web page, the entity identifier 201 may include a Uniform Resource Locator ("URL"), Uniform Resource Name ("URN"), or other Uniform Resource Identifier ("URI"). Similarly, when the associated entity is a person and/or user account, the entity identifier 201 may include a name, email address, user ID, and the like. In other embodiments, the entity identifier 201 may comprise a database foreign key.

The exemplary score record 200 also includes a latest event time ($t_{LAST}$) indicator 205. In the illustrated embodiment, $t_{LAST}$ 205 indicates the time of the latest scoring event previously accumulated (relative to $t_0$). For example, if scoring events had been previously recorded for event scores at times 1, 3, and 5 units after $t_0$, then $t_{LAST}$ would have a value of 5. If an event score is subsequently recorded for an earlier event score at time 4, then $t_{LAST}$ would still have a value of 5. In some embodiments, $t_{LAST}$ may be expressed in any unit that corresponds to a time period, including milliseconds, ticks, seconds, days, weeks, sequence numbers, and the like.

The exemplary score record 200 also includes one or more sets 225 of score values, each set 225 corresponding to a particular exponential scaling period constant. Exponential functions can be characterized by a scaling period ("h"). For example, exponential functions can be characterized by a half-life, the period over which the value of the weighting function exactly doubles (for exponentially increasing functions) or halves (for exponentially decreasing functions). In some embodiments, more than one set 225 of scores may be maintained, each set 225 corresponding to a different scaling period. For example, one set may be associated with a scaling period of one day, while a second set may be associated with a scaling period of one week. In such embodiments, score record 200 may include an explicit exponential scaling period constant indicator 210 associated with each set 225 of score values. In other embodiments, each set 225 may be implicitly associated with a particular exponential scaling period constant, obviating the need to store an explicit indicator 210. In general, an exponential scaling period constant does not change. However, in some cases, it may be desirable to update a set 225 of scores to a new scaling period constant, as illustrated in FIG. 12 and discussed below.

In one embodiment, each set 225 of score values in the exemplary score record 200 may include a temporally-localized score value ("S") 215, relative to $t_{LAST}$ such that S 215 is directly comparable only to other temporally-localized score values that have the same value of $t_{LAST}$. In other embodiments, score record 200 may not store a value for S, as S may be computed using the temporally-globalized score (see below), $t_{LAST}$, and h.

Finally, in one embodiment, each set 225 of score values in the exemplary score record 200 includes a temporally-globalized score ("Log S") 220, relative to $t_0$, which is directly comparable to all other temporally-globalized score values (as all other temporally-globalized score values share the same time base).

In some embodiments, score record 200 also includes one or more trending status indicator(s) 230. (See FIG. 10, discussed below.)

Figure 3:
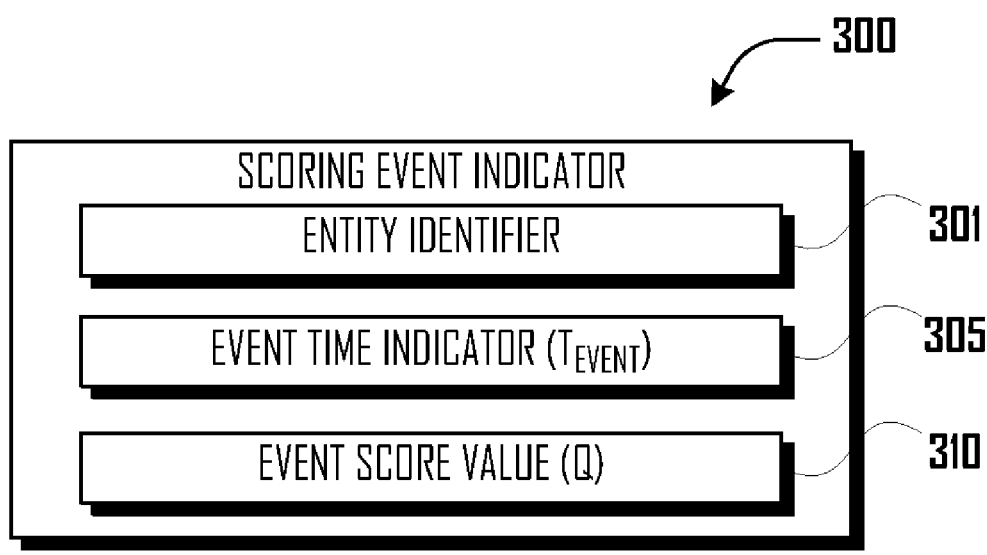
FIG. 3 is a diagram illustrating an exemplary scoring event indicator in accordance with one embodiment.

FIG. 3 illustrates an exemplary scoring event indicator 300 in accordance with one embodiment. The exemplary scoring event indicator 300 includes an entity identifier 301, which corresponds to the entity identifier field 201 of the exemplary score record 200. The exemplary scoring event indicator 300 also includes an event time indicator ($t_{EVENT}$) 305, which indicates the time the scoring event occurred relative to $t_0$. The exemplary scoring event indicator 300 also includes an event score value ("Q") 310 (e.g., a scoring event associated with selecting a story to read may have a Q of 1.0, while a scoring event associated with recommending a story to another may have a Q of 3.0).

Figure 4:
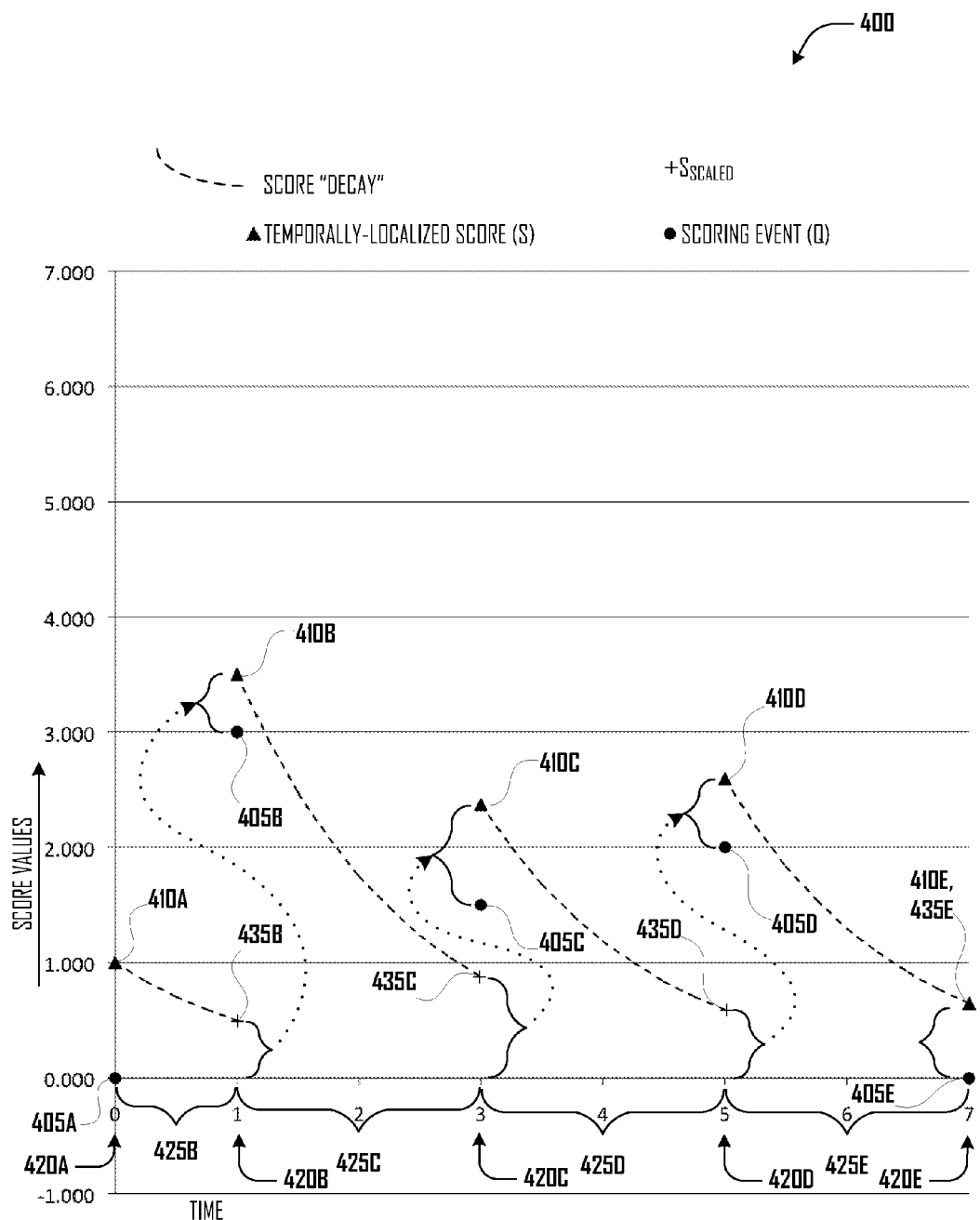
FIGS. 4-5 are diagrams graphically illustrating interim values used when updating a temporally-globalized score associated with an entity in accordance with one embodiment.
Figure 5:
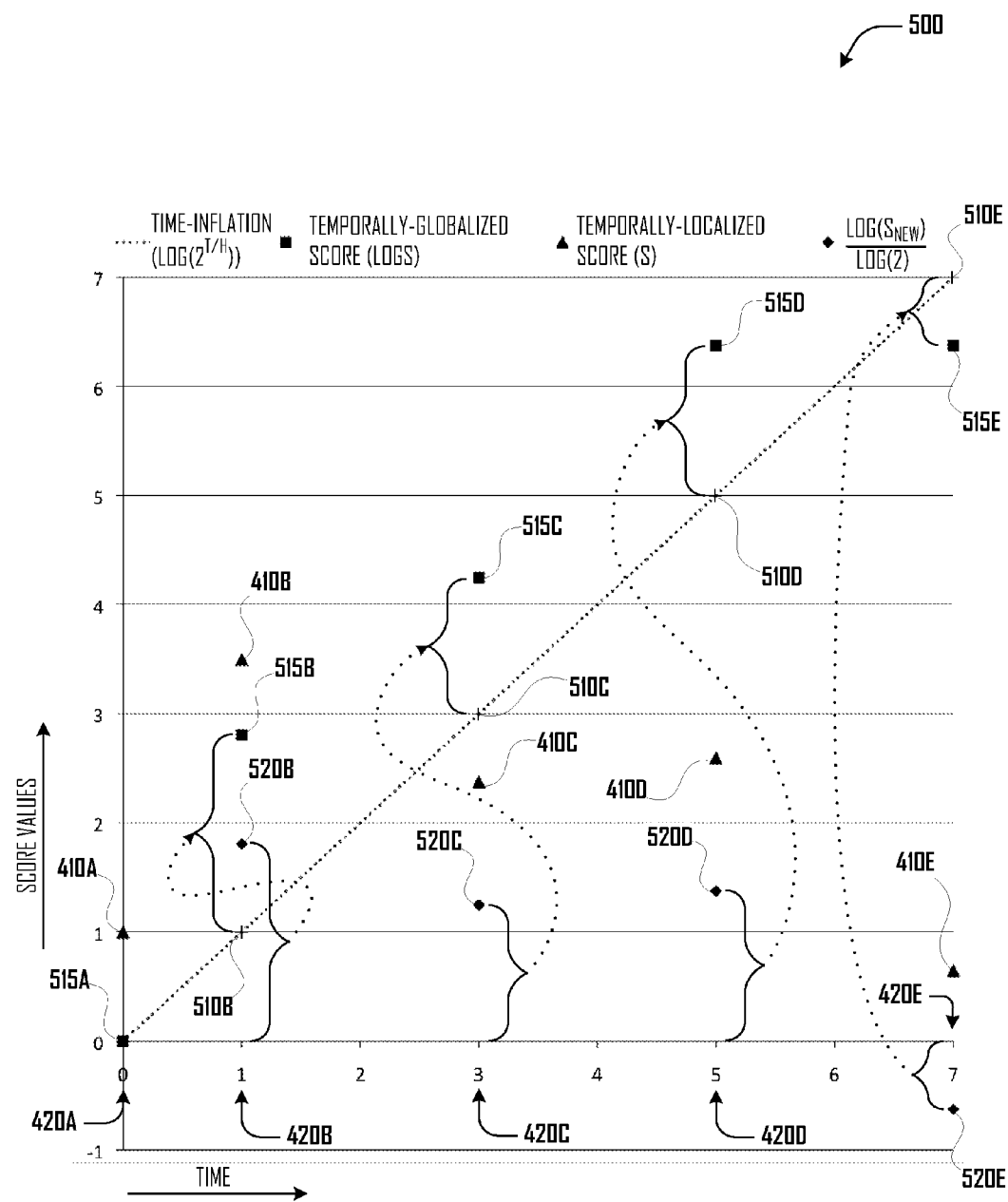

FIGS. 4-5 graphically illustrate interim values used when updating a temporally-globalized score ("Log S") associated with an entity, given a new scoring event having a score value Q at time $t_{EVENT}$ (the score has an exponential scaling period, h, corresponding to a half-life of 1.0). For embodiments that store a value for S, the basic math involved in updating a score record according to one embodiment may be expressed as follows:

If $t_{EVENT} > t_{LAST}$ (the scoring event is newer than $t_{LAST}$):

$$S_{NEW} = Q + \left(\frac{1}{2}^{\left(\frac{t_{EVENT} - t_{LAST}}{h}\right)} * S\right) \quad \text{EQUATION 2}$$

$$t_{LAST} = t_{EVENT}$$

else if $t_{EVENT} <= t_{LAST}$ (the scoring event is not newer than $t_{LAST}$):

$$S_{NEW} = \left(\frac{1}{2}^{\left(\frac{t_{LAST} - t_{EVENT}}{h}\right)} * Q\right) + S \quad \text{EQUATION 3}$$

In embodiments that do not store a value for S, the basic math involved in updating a score record according to one embodiment may be expressed as follows:

If $t_{EVENT} > t_{LAST}$ (the scoring event is newer than $t_{LAST}$):

$$S_{NEW} = 2^{\left(LogS - \frac{t_{EVENT}}{h}\right)} + Q \quad \text{EQUATION 4}$$

$$t_{LAST} = t_{EVENT}$$

else if $t_{EVENT} <= t_{LAST}$ (the scoring event is not newer than $t_{LAST}$):

$$S_{NEW} = 2^{\left(LogS - \frac{t_{LAST}}{h}\right)} + \left(\frac{1}{2}^{\left(\frac{t_{LAST} - t_{EVENT}}{h}\right)} * Q\right) \quad \text{EQUATION 5}$$

Once S has been calculated and $t_{LAST}$ updated (if appropriate), Log S may be calculated in one embodiment as follows:

$$LogS_{NEW} = \frac{\log(S_{NEW})}{\log(2.0)} + \frac{t_{LAST}}{h} \quad \text{EQUATION 6}$$

or alternately $$LogS_{NEW} = \log_2(S_{NEW}) + \frac{t_{LAST}}{h}$$

FIG. 4 graphically depicts values used in determining new temporally-localized values ($S_{NEW}$) for a number of scoring events 405A-E for an entity in accordance with one embodiment. The illustrated sequence shows values for only one set of scores, the set having an exponential scaling period corresponding to a half-life (h) of 1.0. Temporally-localized score 410A represents the initial state, with an initial S value 410A of 1.0 and an initial $t_{EAST}$ value equal to $t_0$.

The entity associated with the scores illustrated in FIG. 4 accumulates a scoring event with a Q 405B of 3.0 and a $t_{EVENT}$ 420B of 1.0. The score updating routine (see also FIG. 7, discussed below) determines the current value of S ($S_{CURRENT}$) 410A for the entity, as well as the magnitude of the time offset ($t_{OFFSET}$) 425B between $t_{EVENT}$ 420B and $t_{LAST}$ 420A, $t_{OFFSET}$ being expressed as a multiple of the exponential scaling period:

$$t_{OFFSET} = \frac{|t_{EVENT} - t_{LAST}|}{h} \quad \text{EQUATION 7}$$

Here, $t_{OFFSET}$ 425B for the first scoring event is 1.0. Using $t_{OFFSET}$ 425B, the score updating routine determines an exponential scaling factor ($t_{SCALE}$) (not shown), which is used to determine a "decayed" or scaled value for S ($S_{SCALED}$) 435B of 0.5 as of time $t_{EVENT}$:

$$t_{SCALE} = \left(\frac{1}{2}\right)^{t_{OFFSET}} \quad \text{EQUATION 8}$$

$$S_{SCALED} = t_{SCALE} * S_{CURRENT} \quad \text{EQUATION 9}$$

A new temporally-localized value ($S_{NEW}$) 410B of 3.5 may be obtained by adding $S_{SCALED}$ 435B to Q 405B:

$$S_{NEW} = S_{SCALED} + Q \quad \text{EQUATION 10}$$

After the scoring event with $t_{EVENT}$ 420B of 1.0, $t_{LAST}$ is updated to 1.0.

Similarly, a scoring event with a Q 405C of 1.5 and a $t_{EVENT}$ 420C of 3.0 results in a $t_{OFFSET}$ 425C of 2.0, an $S_{SCALED}$ value 435C of 0.875, and an $S_{NEW}$ value 410C of 2.375. After the scoring event with $t_{EVENT}$ 420C of 3.0, $t_{LAST}$ is updated to 3.0.

The scoring event with a Q 405D of 2.0 and a $t_{EVENT}$ 420D of 5.0 results in a $t_{OFFSET}$ 425D of 2.0, an $S_{SCALED}$ 435D of 0.59375, and an $S_{NEW}$ value 410D of 2.59375. After the scoring event with $t_{EVENT}$ 420D of 5.0, $t_{LAST}$ is updated to 5.0.

The scoring event with a Q 405E of 0.0 and a $t_{EVENT}$ 420E of 7.0 results in a $t_{OFFSET}$ 425E of 2.0, an $S_{SCALED}$ 435E of about 0.648, and an $S_{NEW}$ value 410E of 0.648. After the scoring event with $t_{EVENT}$ 420E of 7.0, $t_{LAST}$ is updated to 7.0.

FIG. 5 graphically depicts values used when determining new globally-localized score values (Log $S_{NEW}$) based on the $S_{NEW}$ values 410A-E (as illustrated in FIG. 4). Globally-localized score value 515A has an initial value of 0.0 at $t_0$. The scoring event with a $t_{EVENT}$ 420B of 1.0 results in an $S_{NEW}$ 410B of 3.5. The score updating routine determines a "compressed" or log value ($S_{LOG}$) 520B corresponding to $S_{NEW}$ 410B of about 1.807:

$$S_{LOG} = \frac{\log(S_{NEW})}{\log(2.0)} \quad \text{EQUATION 11}$$

or alternately $$S_{LOG} = \log_2(S_{NEW})$$

The score updating routine also determines a time-inflation addend value ($t_{INFLATION}$) 510B corresponding to $t_{EVENT}$ 430 of 1.0. $T_{INFLATION}$ 510B corresponds to the log of a point along an exponentially-increasing curve:

$$t_{INFLATION} = \log_2\left(2^{\frac{t_{EVENT}-t_0}{h}}\right) \quad \text{EQUATION 12}$$

In one embodiment, the expression to compute $t_{INFLATION}$ may be simplified as follows:

$$t_{INFLATION} = \frac{t_{EVENT} - t_0}{h} \quad \text{EQUATION 13}$$

A new temporally-globalized score (Log $S_{NEW}$) 515B of about 2.807 may be obtained using $t_{INFLATION}$ 510B and $S_{LOG}$ 520B:

$$\text{Log } S_{NEW} = S_{LOG} + t_{INFLATION} \quad \text{EQUATION 14}$$

Similarly, the scoring event with a $t_{EVENT}$ 420C of 3.0 and an $S_{NEW}$ value 410C of 2.375 results in an $S_{LOG}$ value 520C of about 1.248, a $t_{INFLATION}$ value of 3.0, and a Log $S_{NEW}$ score 515C of about 4.248.

The scoring event with a $t_{EVENT}$ 420D of 5.0 and an $S_{NEW}$ value 410D of 2.59375 results in an $S_{LOG}$ value 520D of about 1.375, a $t_{INFLATION}$ value of 5.0, and a Log $S_{NEW}$ score 515D of about 6.375.

The scoring event with a $t_{EVENT}$ 420E of 7.0 and an $S_{NEW}$ value 410E of 0.648 results in an $S_{LOG}$ value 520E of about −0.625, a $t_{INFLATION}$ value of 7.0, and a Log $S_{NEW}$ score 515E of about 6.375 (identical to Log $S_{NEW}$ score 515D).

Thus, accumulating a scoring event with a scoring value (Q) of 0.0 does not alter the temporally-globalized score (Log S). Accordingly, accumulating a zero-valued scoring event does not alter an entity's position within a list of entities sorted according to Log S. However, accumulating a zero-valued scoring event does have the effect of "normalizing" the temporally-localized score (S) to the event time of the scoring event. In some embodiments, it may be desirable to perform such a normalization operation on score values before they are displayed to a user.

Figure 6:
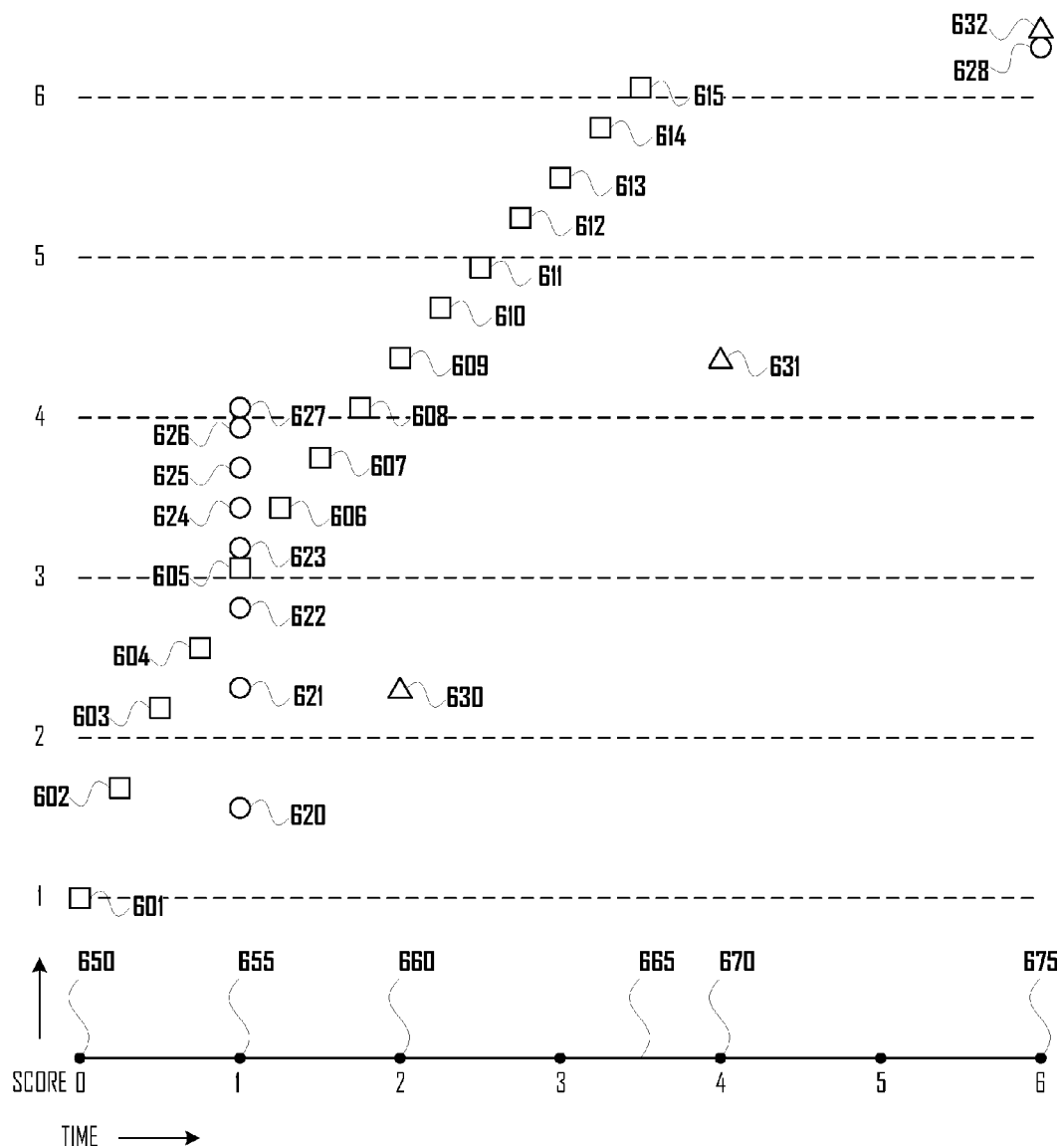
FIG. 6 is a diagram depicting an exemplary series of temporally-globalized score values for three entities in accordance with one embodiment.

FIG. 6 depicts a series of temporally-globalized score values (Log S) for three entities, the score values determined according to the processes described above in reference to FIGS. 4-5. A first entity (Entity A) accumulates fifteen scoring events at regular time intervals of ¼ from $t_0$ 650 to time 3.5 665, each scoring event having a scoring value (Q) of 1.0, resulting in approximate Log S score values 601-615 as illustrated. Entity B accumulates eight scoring events at event time 1.0 655 and one scoring event at event time 6.0 675, each scoring event having a scoring value (Q) of 1.0, resulting in approximate Log S score values 620-628 as illustrated. Entity C accumulates three scoring events at event times 2.0 660, 4.0 670, and 6.0 675, each scoring event having a scoring value (Q) of 1.0, resulting in approximate Log S score values 630-632 as illustrated.

As may be inferred from FIG. 6, as of time 6.0 675, an entity list ordered according to the entities' most recent temporally-globalized (Log S) scores 615, 628, 632 would put Entity C ahead of Entity B ahead of Entity A. Thus, by using temporally-globalized score values 615, 628, 632, the relative popularity of Entities A-C can be directly compared at time 6.0 675, even though Entity A has not accumulated a scoring event since time 3.5 665.

FIG. 7 illustrates an event scoring routine 700 in accordance with one embodiment. In block 705, routine 700 obtains a scoring event indicator for an indicated entity identifier, the scoring event indicator including at least an event score value ($Q_{EVENT}$) and an event time ($t_{EVENT}$). In block 710, routine 700 obtains a latest event time indicator ($t_{LAST}$) 205 associated with the indicated entity. Beginning in loop block 715, routine 700 iterates over one or more exponential scaling period constants (h). For example, in one embodiment, routine may first accumulate a first score using a scaling period constant corresponding to a half-life of one day, and then accumulate a second score using scaling period constant corresponding to a half-life of one week.

In block 720, routine 700 obtains a temporally-globalized score value (Log $S_{CURRENT}$) 220 associated with the current exponential scaling period constant ($h_{CURRENT}$) and the indicated entity identifier. In one embodiment, obtaining a temporally-globalized score value may include retrieving from a database a stored Log $S_{CURRENT}$ value associated with $h_{CURRENT}$ and the indicated entity identifier.

In block 725, routine 700 obtains a temporally-localized score value ($S_{CURRENT}$) 220 associated with the current exponential scaling period constant ($h_{CURRENT}$) and the indicated entity identifier. In one embodiment, $S_{CURRENT}$ may be obtained by retrieving from a database a stored $S_{CURRENT}$ value associated with $h_{CURRENT}$ and the indicated entity identifier. In other embodiments, $S_{CURRENT}$ may be obtained by computing it according to Log $S_{CURRENT}$, $t_{LAST}$, and $h_{CURRENT}$. For example, in one embodiment, $S_{CURRENT}$ may be computed as follows:

$$S_{CURRENT} = 2^{\left(\log S_{CURRENT} - \frac{t_{LAST}}{h_{CURRENT}}\right)} \quad \text{EQUATION 15}$$

In block 800, routine 700 calls subroutine 800 (see FIG. 8, discussed below) to update $t_{LAST}$ and obtain an updated temporally-localized score value ($S_{NEW}$) according to the scoring event indicator obtained in block 705. In block 900, routine 700 calls subroutine 900 (see FIG. 9, discussed below) to obtain an updated globally-localized score value (Log $S_{NEW}$) according to $S_{NEW}$, $t_{LAST}$, and $h_{CURRENT}$.

In block 740, routine 700 stores Log $S_{NEW}$ in association with $h_{CURRENT}$ and the indicated entity identifier, Log $S_{NEW}$ being used as a sort key in a list of entity identifiers ordered according to their respective temporally-globalized score (Log S) values. In ending loop block 750, routine 700 iterates back to beginning loop block 715 to process the next exponential scaling period constant (if any).

In block 1000, routine 700 calls subroutine 1000 (see FIG. 10, discussed below) to optionally determine one or more trending score values (if any). Routine 700 ends in block 799.

Figure 8:
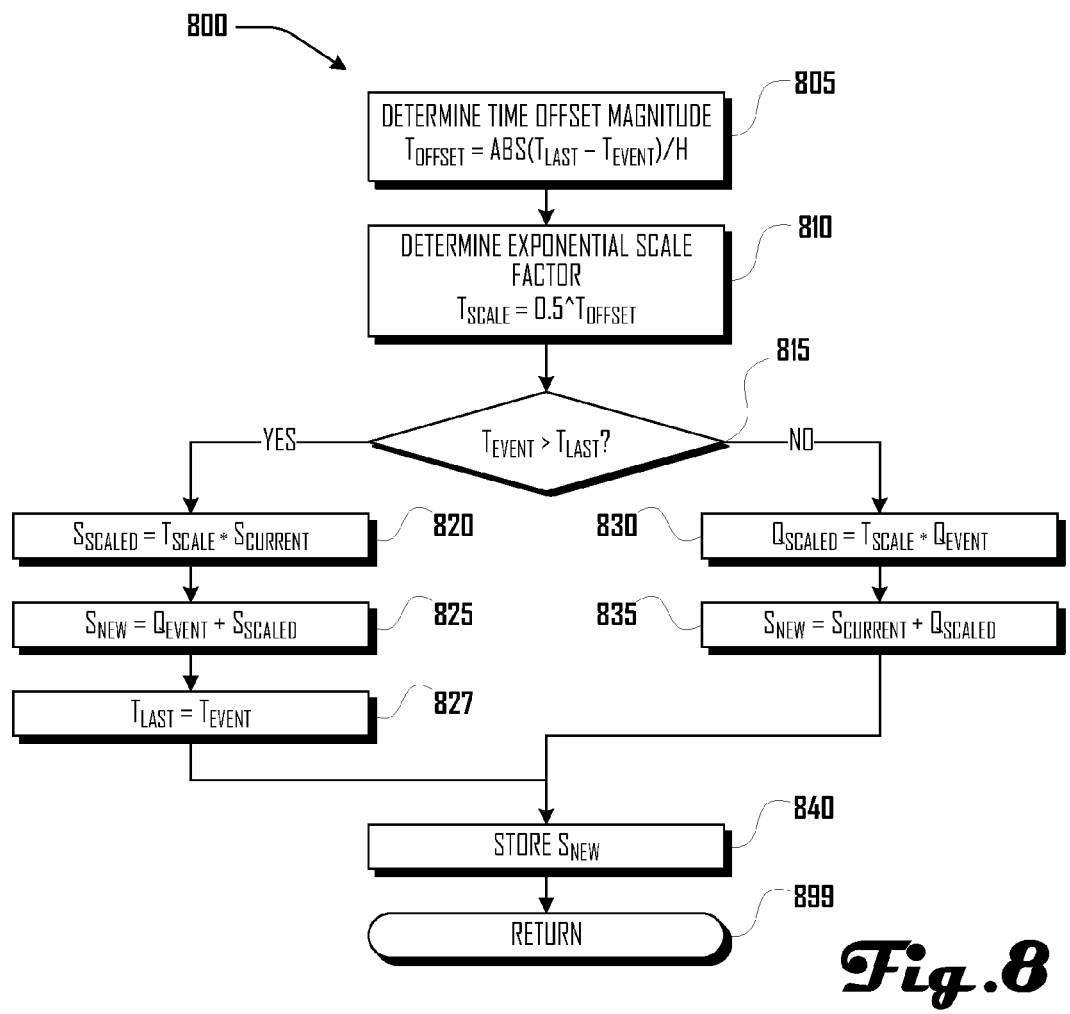
FIG. 8 is a flow diagram illustrating a temporally-localized score value updating subroutine in accordance with one embodiment.

FIG. 8 illustrates a temporally-localized score value updating subroutine 800 in accordance with one embodiment. In block 805, subroutine 800 determines a time offset magnitude ($t_{OFFSET}$) corresponding to the current $t_{LAST}$ and $t_{EVENT}$ values. In one embodiment, subroutine 800 may determine $t_{OFFSET}$ according to Equation 7, discussed above.

In block 810, subroutine 800 determines an exponential scaling factor ($t_{SCALE}$). In one embodiment, subroutine 800 may determine $t_{SCALE}$ according to Equation 8, discussed above.

In decision block 815, subroutine 800 determines whether the event time of the scoring event indicator ($t_{EVENT}$) is later than the current value of $t_{LAST}$. If $t_{EVENT}$ is later than $t_{LAST}$, subroutine 800, in block 820, determines a "decayed" or scaled value for $S_{CURRENT}$ ($S_{SCALED}$) as of time $t_{EVENT}$. (See also $S_{SCALED}$ 435B-D, as illustrated in FIG. 4, discussed above.) In one embodiment, subroutine 800 may determine $S_{SCALED}$ according to Equation 9, discussed above. In block 825, subroutine 800 determines a new temporally-localized score value ($S_{NEW}$). In one embodiment, subroutine 800 may determine $S_{NEW}$ according to Equation 10, discussed above. In block 827, subroutine 800 sets $t_{LAST}$ equal to $t_{EVENT}$.

If subroutine 800 determines in decision block 815 that $t_{EVENT}$ is not later than $t_{LAST}$, subroutine 800, in block 830, determines a "decayed" or scaled value for $Q_{EVENT}$ ($Q_{SCALED}$) as of time $t_{EVENT}$. In one embodiment, $Q_{SCALED}$ may be computed as follows:

$$Q_{SCALED} = t_{SCALE} * Q_{EVENT} \qquad \text{EQUATION 16}$$

In block 835, subroutine 800 determines a new temporally-localized score value ($S_{NEW}$). In one embodiment, subroutine 800 may determine $S_{NEW}$ as follows:

$$S_{NEW} = S_{CURRENT} + Q_{SCALED} \qquad \text{EQUATION 17}$$

When $t_{EVENT}$ is not later than $t_{LAST}$, subroutine 800 does not need to update $t_{LAST}$.

After determining the new temporally-localized score value ($S_{NEW}$), subroutine 800 stores $S_{NEW}$ at least temporarily. In one embodiment, $S_{NEW}$ may be stored persistently in association with the current entity identifier. In other embodiments, $S_{NEW}$ may be stored only transiently, at least for long enough to compute a temporally-globalized score value (see FIG. 9, discussed below). In block 899, subroutine 800 returns, providing a value for $S_{NEW}$ to the calling routine.

Figure 9:
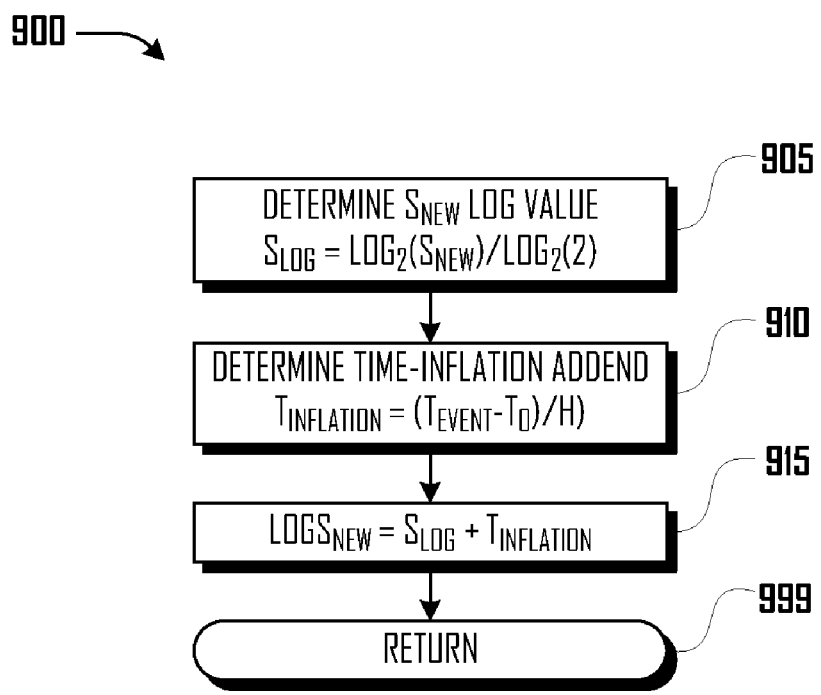
FIG. 9 is a flow diagram illustrating a temporally-globalized score value updating subroutine in accordance with one embodiment.

FIG. 9 illustrates a temporally-globalized score value updating subroutine 900 in accordance with one embodiment. In block 905, subroutine 900 determines a "compressed" or log value for $S_{NEW}$ ($S_{LOG}$). In one embodiment, subroutine 900 may determine $t_{SCALE}$ according to Equation 11, discussed above.

In block 910, subroutine 900 determines a time-inflation addend value ($t_{INFLATION}$) corresponding to $t_{EVENT}$. (See also $t_{INFLATION}$ 510B-E, as illustrated in FIG. 5 and discussed above.) In one embodiment, subroutine 900 may determine $t_{INFLATION}$ according to Equation 12 or Equation 13, discussed above.

In block 915, subroutine 900 determines a temporally-globalized score (Log $S_{NEW}$) corresponding to $S_{LOG}$ and $t_{INFLATION}$. In one embodiment, subroutine 900 may determine $T_{INFLATION}$ according to Equation 14, discussed above. In block 899, subroutine 800 returns, providing a value for Log $S_{NEW}$ to the calling routine.

Figure 10:
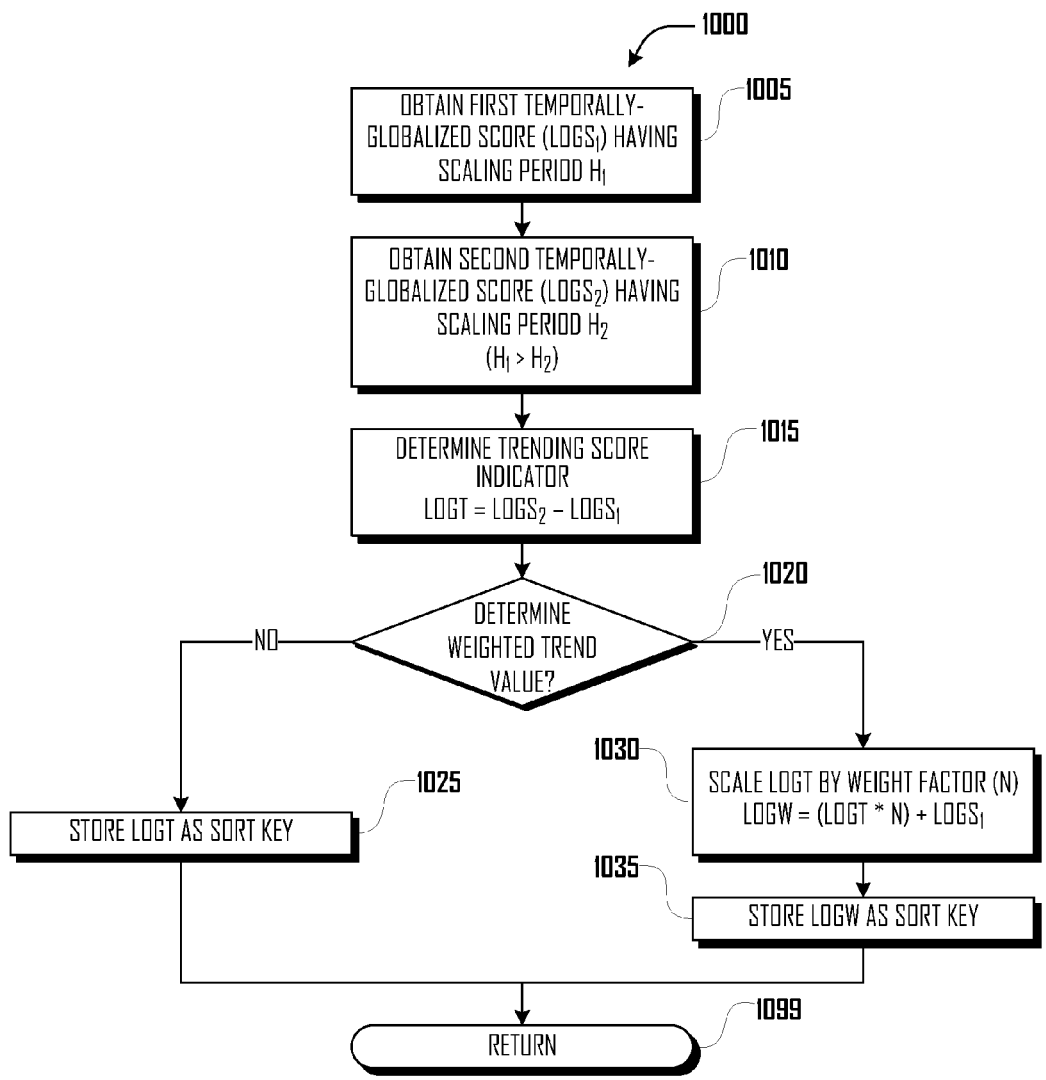
FIG. 10 is a flow diagram illustrating a trending score determining subroutine in accordance with one embodiment.

FIG. 10 illustrates a trending score determining subroutine 1000 in accordance with one embodiment. In some embodiments, temporally-globalized score values (Log S) can also be used to automatically identify trending scores (i.e., score values that are increasing or decreasing with a high rate of change). By calculating multiple Log S values with different exponential scaling periods (corresponding, e.g., to half-lives of one day, one week, one month, one year, and the like), the difference of two Log S scores with different scaling periods may indicate near-term or trending popularity.

For example, an entity may customarily accumulate scoring events with an aggregate of ten scoring units each day. These scoring events may be accumulated into two sets of scores, one with an exponential scaling period corresponding to a half-life of one day ($S_d$), and one with an exponential scaling period corresponding to a half-life of one week ($S_w$). On a normal day, the ratio of a daily temporally-localized score ($S_d$) to the weekly temporally-localized score ($S_w$) will be roughly equal to a constant value corresponding to a ratio of the shorter scaling period (e.g., one day) to the longer scaling period (e.g., seven days). However, if activity for the entity spikes to, e.g., twice it's normal level on a particular day, then the ratio of that day's daily score ($S_d$) to the weekly score ($S_w$) will be greater than the expected constant value by a factor of two. In other words, in this example, the entity's trending status (T) may be expressed as a ratio of the entity's daily score ($S_d$) to its weekly score ($S_w$):

$$T = S_d / S_w \qquad \text{EQUATION 18}$$

As discussed above, various embodiments compute and store temporally globalized values (Log $S_d$ and Log $S_w$), which include log values corresponding to temporally-localized scores $S_d$ and $S_w$. Because $$\log\left(\frac{a}{b}\right) = \log(a) - \log(b)$$

the difference between temporally-globalized values Log $S_d$ and Log $S_w$ may be a convenient proxy (Log T) for the trending status formula shown in Equation 18. In other words, in some embodiments, a trending status indicator (Log T) 230 (as illustrated in FIG. 2) may be computed as follows:

$$\text{Log } T = \text{Log } S_d - \text{Log } S_w \qquad \text{EQUATION 19}$$

In such embodiments, Log T may be stored and used as a sort key into an ordered list of entity identifiers, the ordered list being useful to identify trending entity identifiers simply by obtaining a number of entities from the top of the list.

In statistics, deviations from the norm are often expressed as the square of the deviation. In the same way, a trending function may be defined as a higher power of the trend ratio. For example, a trending function ($T_2$) may be defined as the square of the ratio of the entity's daily score ($S_d$) to its weekly score ($S_w$), the trending function used to weight the longer-term score to determine a weighted trend value (W):

$$T_2 = (S_d / S_w)^2$$

$$W = T_2 * S_w \qquad \text{EQUATION 20}$$

Using a log-proxy for such a trending function, a trend indictor may be normalized to preferentially have higher scores for entities that have high baseline scores. For example, a weighted log-proxy (Log W) may be defined as follows:

$$N_{FACTOR} = 2$$

$$\text{Log } W = [N_{FACTOR} * (\text{Log } S_d - \text{Log } S_w)] + \text{Log } S_w \qquad \text{EQUATION 21}$$

This technique may highlight those entities that already have a relatively high baseline score more heavily, and yet still allow low-scoring entities to rank highly if their near-term trend indicators are large enough.

In block 1005, subroutine 1000 obtains a first temporally-globalized score value (Log $S_1$) having a first exponential scaling period ($h_1$). In block 1010, subroutine 1000 obtains a second temporally-globalized score value (Log $S_2$) having a second exponential scaling period ($h_2$), wherein $h_1$ is a longer period than $h_2$.

In block 1015, subroutine 1000 determines a trending score indicator. In one embodiment, subroutine 1000 determines a trending score indicator (Log T) according to Equation 19. In decision block 1020, subroutine 1000 determines whether a weighted trend value is desired. If not, in block 1025, subroutine 1000 stores Log T as a sort key into an ordered list of entity identifiers.

If in decision block 1020, subroutine 1000 determines that a weighted trend value is desired, subroutine 1000 scales Log T by a weighting factor and adds Log $S_1$ (the score value having the longer exponential scaling period) to obtain Log W. In block 1035, subroutine 1000 stores Log W as a sort key into an ordered list of entity identifiers. Subroutine 1000 ends in block 1099.

Figure 11:
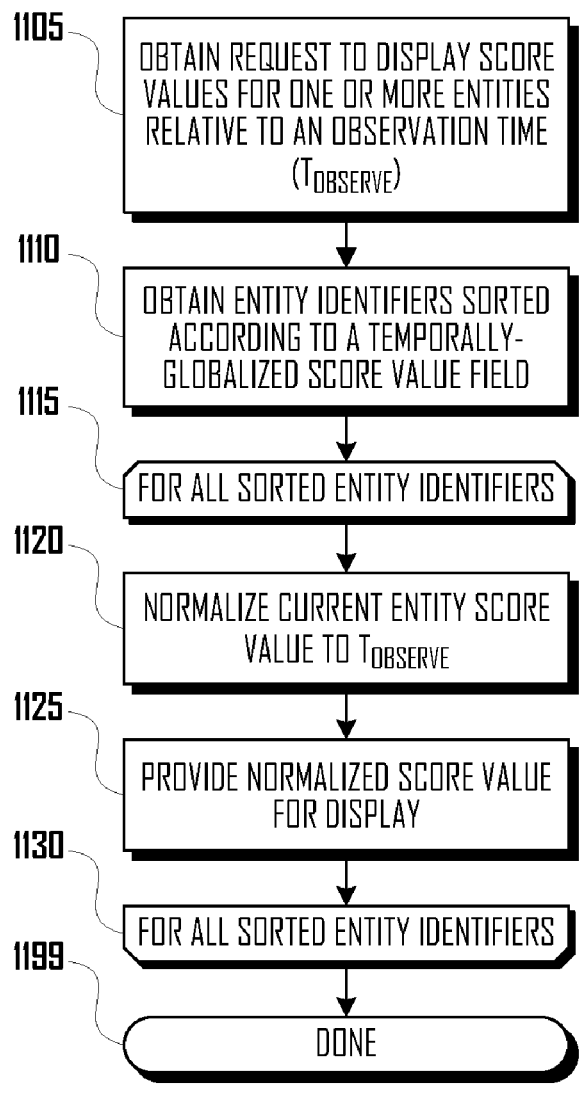
FIG. 11 is a flow diagram illustrating a sorted entity display routine in accordance with one embodiment.

FIG. 11 illustrates a sorted entity display routine 1100 in accordance with one embodiment. In block 1105, routine 1100 obtains a request to display score values for one or more entities relative to an observation time ($t_{OBSERVE}$), which is no earlier than the latest $t_{LAST}$ value of the score values in question. In block 1110, routine 1100 obtains a plurality of entity identifiers from an ordered list sorted according to their respectively associated temporally-globalized score values (Log S). For example, in one embodiment, obtaining the plurality of entity identifiers may include querying a database to retrieve entity identifiers in descending order according to their associated temporally-globalized score value field.

In some embodiments, it may be preferable to display an entity's temporally-localized score values, rather than its temporally-globalized score values; because the temporally-localized score values do not include a time-inflation component ($t_{INFLATION}$). However, as obtained in block 1110, the plurality of entity identifiers may have differing $t_{LAST}$ values. Thus, as obtained in block 1110, the plurality of entity identifiers may not have temporally-localized score values (S) that are directly comparable to one another. Consequently, in some embodiments, routine 1100 "normalizes" each of the plurality of entity identifiers to have temporally-localized score values relative to $t_{OBSERVE}$.

Beginning in loop block 1115, routine 1100 iterates over each of the sorted entity identifiers. In block 1120, routine 1100 normalizes the current entity's score record to the observation time. In one embodiment, routine 1100 normalizes the score record by accumulating a zero-valued scoring event with an event time equal to $t_{OBSERVE}$. As discussed above in reference to FIG. 5, accumulating a zero-valued scoring event does not alter an entity's temporally-globalised score value (Log S); thus, it does not alter the entity's order within an ordered list. However, accumulating a zero-valued scoring event sets the entity's temporally-localized score ($S_{NORMALIZED}$) relative to $t_{OBSERVE}$.

In block 1125, routine 1100 provides $S_{NORMALIZED}$ for display to a user. In ending loop block 1130, routine 1100 iterates back to beginning loop block to process the next sorted entity identifier (if any). Once all entity identifiers have been processed, routine 1100 ends at block 1199.

Figure 12:
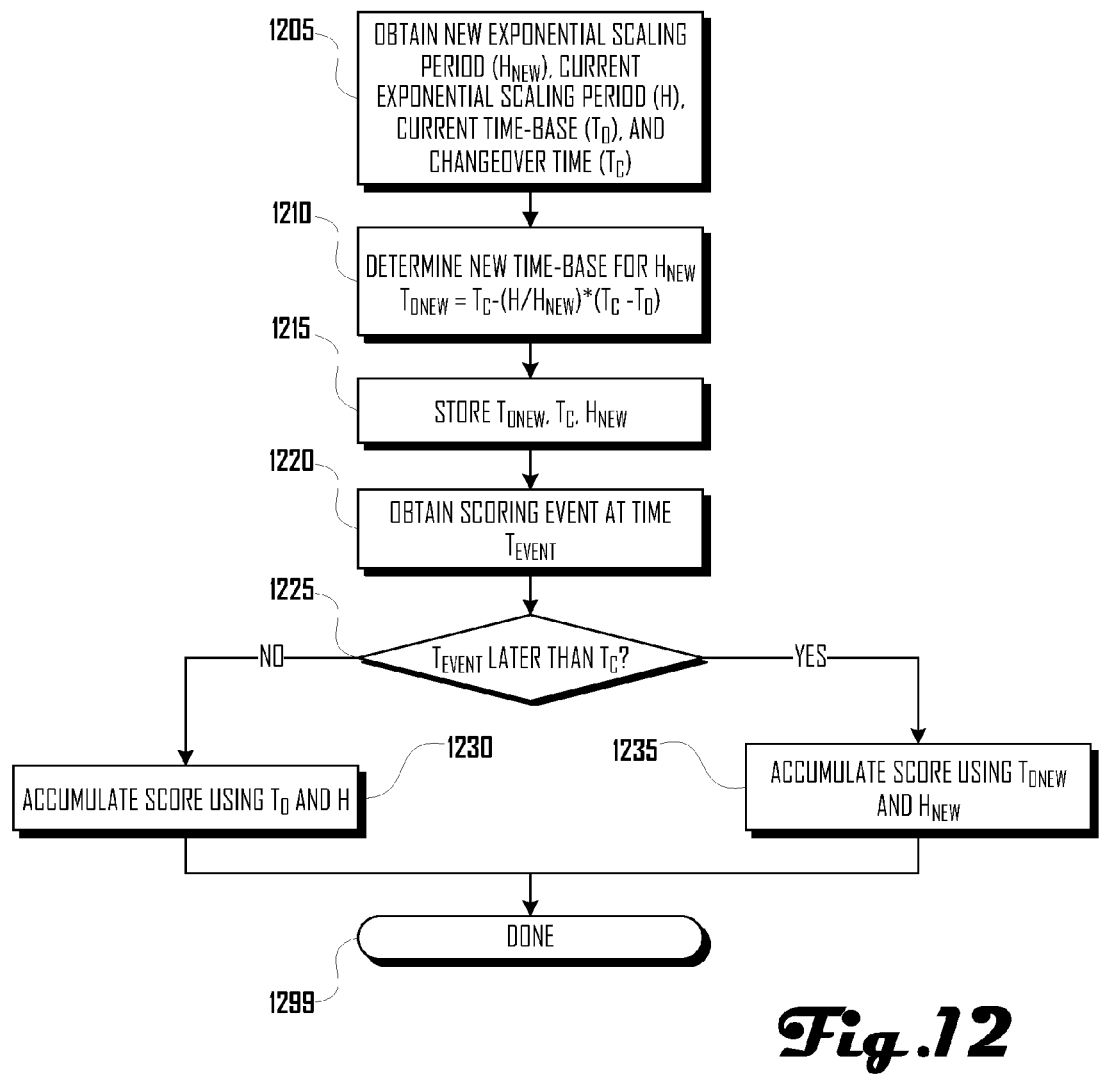
FIG. 12 is a flow diagram illustrating an exponential scaling period update routine in accordance with one embodiment.

FIG. 12 illustrates an exponential scaling period update routine in accordance with one embodiment. Generally speaking, an exponential scaling period value for sets of scores across a set of entities remains constant. However, in some cases, it may be desirable to adjust an exponential scaling period after a number of scoring events have been accumulated across a set of entities. As illustrated in FIG. 12, it is possible to adjust the exponential scaling period in such circumstances.

In block 1205, routine 1200 obtains a new exponential scaling period value ($h_{NEW}$) and a changeover time ($T_C$) marking the transition away from the current exponential scaling period value (h) and the current base-time ($t_0$). In block 1210, routine 1200 determines a new time base ($t_{0NEW}$) corresponding to $h_{NEW}$ and $t_C$. In one embodiment, ($t_{0NEW}$) is determined such that $2^{(h \cdot (t_{EVENT} - t_0))}$ is equal to $2^{(h_{NEW} \cdot (t_{EVENT} - t_{0NEW}))}$:

$$t_{0NEW} = t_C - \left(\frac{h}{h_{NEW}} * (t_c - t_0)\right) \qquad \text{EQUATION 22}$$

In block 1215, routine 1200 persistently stores $h_{NEW}$, $t_C$, and $t_{0NEW}$. In block 1220, routine 1200 obtains a new scoring event at time $t_{EVENT}$. In decision block 1225, routine 1200 determines whether $t_{EVENT}$ is later than the changeover time $t_C$. If $t_{EVENT}$ is later than $t_C$, routine 1200 accumulates the scoring event in block 1235 using an exponential scaling period of $h_{NEW}$ and a time-base of $t_{0NEW}$. If $t_{EVENT}$ is not later than $t_C$, routine 1200 accumulates the scoring event in block 1230 using an exponential scaling period of h and a time-base of $t_0$. Routine 1200 ends at block 1299.

In one embodiment, a score updating routine may be implemented in the Python programming language as in the following "ScoreCalc" class, which provides base functions for calculating time-weighted values from a stream of scoring events. The ScoreCalc class is an excerpt from the codebase of a commercial embodiment of the time-weighted scoring systems and methods disclosed herein, Go2.me. The complete source code for Go2.me as of the filing date of this application is available online at the following URL: http://code.google.com/p/g02me/source/browse/#svn/branches/2009-09-freeze.

In the ScoreCalc embodiment, time units are abstract and based at a base-time ($t_0$) of zero. The exponential scaling period is expressed as a half-life with a default of 1.0 time units. The instance variable "S" holds a temporally-localized score, which is valid as of a particular time, tLast. The instance variable "Log S" holds a temporally-globalized score, which is globally comparable, as it is based at time $t_0$. In the ScoreCalc embodiment, S cannot be zero because the log of S (which is undefined at zero) is used as an ordering key. Accordingly, all scores are initialized with a scoring event with a score value (Q) of 1 at event time of $t_0$.

```
class ScoreCalc( ):
    def __init__(self, tHalf=1.0, Q=0.0, tLast=0.0):
        self.tHalf = float(tHalf)
        self.k = 0.5 ** (1.0/self.tHalf)
        self.tLast = 0.0
        self.LogS = 0.0
        self.Increment(Q, tLast)
    def Increment(self, Q=0.0, tEvent=0.0):
        Q = float(Q)
        tEvent = float(tEvent)
        if tEvent > self.tLast:
            self.S = 2.0 ** (self.LogS - tEvent/self.tHalf)
            self.S += Q
            self.tLast = tEvent
        else:
            self.S = 2.0 ** (self.LogS - self.tLast/self.tHalf)
            self.S += (self.k ** (self.tLast - tEvent)) * Q
        try:
            self.LogS = math.log(self.S)/math.log(2) +
                self.tLast/self.tHalf
        except:
            # On underflow - reset to minimum score of 1 at time
```

```
    zero
    self.S = 1.0
    self.tLast = 0.0
    self.LogS = 0.0
```

Time-weighted scoring, such as various embodiments disclosed herein, may have a number of practical applications for information processing systems, some illustrative and non-limiting examples of which are described below.

In one embodiment, the entities to be scored are hyperlinks in a link sharing system. Scores accumulate to links when users interact with the link sharing system. For example, a scoring event may include sending a link to another user; clicking on the title of the link to visit the referenced web page; clicking on a "Like," "Thumbs Up," or similar control associated with the link; marking the link as a personal "Favorite"; adding a comment to the link; and the like.

In some embodiments, adverse scoring events can also be maintained in a separate score for some or all links to identify inappropriate and/or adult content, spam, malware, or other such links. Exemplary adverse scoring events may include a user's clicking a "Thumbs Down," "Report This," or other such control associated with the link.

Various embodiments may efficiently report on the most "popular" links in the sharing system over various time intervals (e.g., a day, a week, a month, a year, and the like). An exemplary link sharing system may further report on the most popular links within a subset of links created by friends of a given user. For example, an exemplary link sharing system may restrict a database query to include only those links that have been shared or created by a given user's friends.

Another embodiment may be used to display a report of the most or least popular news stories on a news web site and/or news aggregation service. Positive and/or adverse scores may be maintained, based on user interactions that indicate good or bad/uninteresting news stories, in a manner similar to that described in the above link sharing system.

Another embodiment may use a time-weighted scoring system to calculate "reputation" among the users of a social network. In one embodiment, a new reputation score for a user may be based upon positive and/or negative feedback provided by other users in reference to content that was created, uploaded, or otherwise provided by the user. In this way, users may be rewarded for having a positive impact in the social network; using the same feedback scores, users who may have an overall negative impact on the community may be identified. Such time-weighted reputation scores can further be used to promote the actions of the highest reputation users, while diminishing the negative impact of the lowest reputation users. In some embodiments, time-weighted user reputation scoring may be auto-correcting over time, able to adjust the reputation of a user whose recent behavior differs from the user's historical pattern. In some embodiments, time-weighted user reputation scores may discriminate by topic. For example, one user may have a relatively high reputation score for a first topic in which they are making positive contributions, while having a lower score for a second topic in which they may have not made significant positive contributions.

Diverse information systems use a system of tags (or keywords) to organize information into multiple categories. In various embodiments, time-weighted scores may accumulate based on activity related to different tags or keywords. Via such time-weighted scores, users may be given a visualization of the most active topics on the system. For example, some embodiments may provide a "tag cloud" listing top scoring keywords, organized such that the font size of each displayed tag is proportional to its score (larger tags being more popular than smaller tags).

In other embodiments, a search engine may measure trending search topics via time-weighted scores. For example, the search engine processes queries, it can accumulate time-weighted scores to individual keywords and keyword phrases in the query strings. The search engine may compute time-weighted trending scores to efficiently track and display top trending search terms. The search engine may also use time-weighted trending scores to direct users to the most relevant pages for trending searches.

In still other embodiments, a security system may accumulate time-weighted scores in real-time to monitor the number of requests being issued by individual users (e.g., as identified by a cookie) and/or by Internet Protocol ("IP") addresses. Such real-time time-weighted scores may be used to monitor possible attacks and/or unauthorized use of the service. In some embodiments, offending users and/or IP addresses may be blocked and/or throttled to mitigate their impact.

In yet another embodiment, time-weighted scoring may be used by a caching system as a metric for determining if a cached resource should be removed from the system to make room for more frequently used resources. As a result of the time-weighting of scores, cache entries can be removed based on their utilization over a recent time interval, rather than by using a simpler metric such as Least Recently Used. Because the time-weighted scores of older entries need not be re-normalized, there may be less need for a scan and sweep of the cache to age out older entries. In some embodiments, in-memory data structures, such as a Heap, Priority Queue, and the like can be used to efficiently maintain an ordered list of the cached entries, such that the lowest scoring entry at any time may be determined relatively easily.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. For example, although the examples provided herein define exponential scaling periods in terms of a half-life and various scaling factors as exponents and logs of two, mathematically equivalent systems could be implemented using exponents and logs of ten, e, or other base, and/or using scaling periods other than half-lives. This application is intended to cover any adaptations or variations of the embodiments discussed herein. All references cited herein are fully incorporated by reference, for all purposes.

The invention claimed is:

1. A method implemented on a computer for maintaining an ordered list of entity identifiers, the method comprising:
   defining in the computer a score updating routine comprising steps a-h:
   a. obtaining a scoring event indicator associated with a entity identifier, said scoring event indicator comprising an event score value ("Q") and an event time indicator ("$t_{EVENT}$") relative to a base time indicator ("$t_0$");
   b. obtaining a first temporally-globalized score value ("$LogS_1$") associated with said entity identifier, wherein $LogS_1$ is relative to $t_0$ and a first predetermined exponential scaling period constant ("$h_1$");
   c. obtaining a first temporally-localized score value ("$S_1$") associated with said entity identifier, wherein $S_1$ is relative to $h_1$ and a last time value ("$t_{LAST}$"), $t_{LAST}$ indicating a number of time units relative to $t_0$ at which LogS$_1$ was previously updated;

d. computing a first exponential scaling factor in accordance with $h_1$ and a time offset magnitude corresponding to $t_{EVENT}$ and $t_{LAST}$;

e. computing an updated first temporally-localized score ("$S_{NEW1}$") in accordance with said first exponential scaling factor, Q, and $S_1$; and f. determining an updated last time value ("$t_{NEW}$") corresponding to the later of $t_{EVENT}$ and $t_{LAST}$;

g. computing an updated first temporally-globalized score ("LogS$_{NEW1}$") in accordance with:
   i) a log value corresponding to $S_{NEW1}$; and
   ii) a time-inflation addend corresponding to $t_{NEW}$ and $h_1$; and h. associating LogS$_{NEW1}$ and $t_{NEW}$ with said entity identifier within a first list of entity identifiers, each member of said first list having:
   i) an associated last time value relative to $t_0$; and
   ii) an associated first temporally-globalized score value relative to $h_1$ and $t_0$, and wherein said first list is ordered according to said first temporally-globalized score values respectively associated with each member of said first list;

performing by the computer said score updating routine, providing as input to said score updating routine a first scoring event indicator associated with a first entity identifier, said first event indicator comprising a first event score value and a first event time indicator relative to $t_0$;

obtaining, at an observation time value ("$t_{OBSERVE}$"), a plurality of highest-scoring entity identifiers by retrieving a plurality of entity identifiers from the top of said first list; and for each of said plurality of highest-scoring entity identifiers:
   obtaining LogS$_1$ associated with said entity identifier, LogS$_1$ being relative to $t_0$ and $h_1$;
   normalizing LogS$_1$ relative to $t_{OBSERVE}$ and $h_1$ ("$S_{OBSERVE}$"); and
   providing $S_{OBSERVE}$ for display to an output device;
   wherein normalizing LogS$_1$ relative to $t_{OBSERVE}$ and $h_1$ comprises performing said score updating routine, providing as input to said score updating routine a normalization scoring event indicator comprising an event score value corresponding to zero and a event time indicator corresponding to $t_{OBSERVE}$.

2. The method of claim 1, wherein obtaining $S_1$ comprises retrieving a previously-stored score value associated with said entity identifier.

3. The method of claim 1, wherein obtaining $S_1$ comprises computing $S_1$ according to LogS$_1$, $t_{LAST}$, $h_1$, and a predetermined constant value.

4. The method of claim 1, wherein said score updating routine further comprises:
   obtaining a second temporally-globalized score value ("LogS$_2$") associated with said entity identifier, wherein LogS$_2$ is relative to a second predetermined exponential scaling period constant ("$h_2$") and $t_0$;
   obtaining a second temporally-localized score value ("$S_2$") associated with said entity identifier, wherein $S_2$ is relative to $h_2$ and $t_{LAST}$;
   computing a second exponential scaling factor in accordance with $h_2$ and said time offset magnitude;
   computing an updated second temporally-localized score ("$S_{NEW2}$") in accordance with said second exponential scaling factor, Q, and $S_2$; and
   computing an updated second temporally-globalized score ("LogS$_{NEW2}$") in accordance with:
      i) a log value corresponding to $S_{NEW2}$, and
      ii) a time-inflation addend corresponding to $t_{NEW}$ and $h_2$; and
   associating LogS$_{NEW2}$ and $t_{NEW}$ with said entity identifier within a second list of entity identifiers, each member of said second list having:
      i) an associated last time value relative to $t_0$; and
      ii) an associated second temporally-globalized score value relative to $h_2$ and $t_0$, and wherein said second list is ordered according to said second temporally-globalized score values respectively associated with each member of said second list.

5. The method of claim 4, further comprising:
   calculating a trending score value ("LogT") corresponding to LogS$_{NEW1}$ and LogS$_{NEW2}$; and
   associating LogT with said entity identifier within a third list of entity identifiers ordered according said LogT values respectively associated with each member of said third list.

6. The method of claim 5, further comprising obtaining a plurality of highest-trending entity identifiers by retrieving a plurality of entity identifiers from the top of said third list.

7. The method of claim 5, wherein calculating said trending score value comprises calculating a difference value corresponding to LogS$_{NEW1}$ and LogS$_{NEW2}$.

8. The method of claim 5, wherein calculating said trending score value comprises calculating a difference value corresponding to LogS$_{NEW1}$ and LogS$_{NEW2}$.

9. The method of claim 8, wherein calculating said trending score value further comprises scaling said difference value according to a weighting factor and adding said scaled difference value to LogS$_{NEW2}$, wherein $h_2$ corresponds to a shorter exponential scaling period than the exponential scaling period corresponding to $h_1$.

10. The method of claim 1, wherein $h_1$ comprises a half-life period.

11. The method of claim 10, wherein computing said first exponential scaling factor comprises:
   determining a number-of-half-life periods corresponding to said time offset magnitude; and
   raising ½ to an exponent corresponding to said determined number-of-half-life periods.

12. The method of claim 1, wherein computing $S_{NEW1}$ comprises:
   when said event time indicator is later than $t_{LAST}$:
      scaling $S_1$ according to said first exponential scaling factor ("$S_{SCALED1}$"); and
      adding $S_{SCALED1}$ and Q; and
   when said event time indicator is not later than $t_{LAST}$:
      scaling Q according to said exponential scaling factor ("$Q_{SCALED}$"); and
      adding $Q_{SCALED}$ and $S_1$.

13. The method of claim 1, wherein said entity identifier comprises a selected one of a Uniform Resource Identifier, a person identifier, database foreign key, and a tag identifier.

14. The method of claim 1, further comprising performing said score record updating routine, providing as input to said score record updating routine a second event indicator associated with a second entity identifier, said second event indicator comprising a second event score and a second event time relative to said base time.

15. The method of claim 14, further comprising obtaining a plurality of score records, including score records associated respectively with and said first entity identifier and said second entity identifier, said selected plurality of score records being selected according to a selection criterion and ordered according to their respective first temporally-globalized score values.

16. The method of claim 15, wherein said plurality of ordered score records are respectively associated with IP addresses making requests to a network server, said IP addresses ordered according to time-weighted request frequency.

17. The method of claim 15, wherein said plurality of ordered score records are respectively associated with a selected one of:
    links ordered according to time-weighted sharing frequency in a link-sharing system;
    news stories ordered according to time-weighted user actions;
    tags ordered according to time-weighted usage frequency;
    users ordered according to their time-weighted activities in a social network;
    users ordered according to time-weighted ratings made by others in a social network;
    messages ordered according to time-weighted broadcast and/or rebroadcast frequency;
    web pages ordered according to time-weighted user clicks in search results; and
    keywords ordered according to time-weighted search frequency.

18. The method of claim 5, further comprising:
    further comprising performing said score record updating routine, providing as input to said score record updating routine a second event indicator associated with a second entity identifier, said second event indicator comprising a second event score and a second event time relative to said base time;
    obtaining a plurality of ordered score records, including score records associated respectively with and said first entity identifier and said second entity identifier, said selected plurality of score records being selected according to a selection criterion and ordered according to their respective first temporally-globalized score values; and
    wherein said plurality of ordered score records are respectively associated with a selected one of:
        words ordered according to time-weighted trending use frequency within broadcast messages; and
        words ordered according to time-weighted trending use frequency within news stories.

19. A non-transitory computer-readable storage medium including instructions that, when executed by a processor, perform a method comprising:
    defining a score updating routine comprising steps a-h:
    a. obtaining a scoring event indicator associated with a entity identifier, said scoring event indicator comprising an event score value ("Q") and an event time indicator ("$t_{EVENT}$") relative to a base time indicator ("$t_0$");
    b. obtaining a first temporally-globalized score value ("$LogS_1$") associated with said entity identifier, wherein $LogS_1$ is relative to $t_0$ and a first predetermined exponential scaling period constant ("$h_1$");
    c. obtaining a first temporally-localized score value ("$S_1$") associated with said entity identifier, wherein $S_1$ is relative to $h_1$ and a last time value ("$t_{LAST}$"), $t_{LAST}$ indicating a number of time units relative to $t_0$ at which $LogS_1$ was previously updated;
    d. computing a first exponential scaling factor in accordance with $h_1$ and a time offset magnitude corresponding to $t_{EVENT}$ and $t_{LAST}$;
    e. computing an updated first temporally-localized score ("$S_{NEW1}$") in accordance with said first exponential scaling factor, Q, and $S_1$; and
    f. determining an updated last time value ("$t_{NEW}$") corresponding to the later of $t_{EVENT}$ and $t_{LAST}$;
    g. computing an updated first temporally-globalized score ("$LogS_{NEW1}$") in accordance with:
        i) a log value corresponding to $S_{NEW1}$; and
        ii) a time-inflation addend corresponding to $t_{NEW}$ and $h_1$; and
    h. associating $LogS_{NEW1}$ and $t_{NEW}$ with said entity identifier within a first list of entity identifiers, each member of said first list having:
        i) an associated last time value relative to $t_0$; and
        ii) an associated first temporally-globalized score value relative to $h_1$ and $t_0$, and wherein said first list is ordered according to said first temporally-globalized score values respectively associated with each member of said first list; and
    performing said score updating routine, providing as input to said score updating routine a first scoring event indicator associated with a first entity identifier, said first event indicator comprising a first event score value and a first event time indicator relative to $t_0$;
    obtaining, at an observation time value ("$t_{OBSERVE}$"), a plurality of highest-scoring entity identifiers by retrieving a plurality of entity identifiers from the top of said first list; and
    for each of said plurality of highest-scoring entity identifiers:
        obtaining $LogS_1$ associated with said entity identifier, $LogS_1$ being relative to $t_0$ and $h_1$;
        normalizing $LogS_1$ relative to $t_{OBSERVE}$ and $h_1$ ("$S_{OBSERVE}$"); and
        providing $S_{OBSERVE}$ for display to an output device;
        wherein normalizing $LogS_1$ relative to $t_{OBSERVE}$ and $h_1$ comprises performing said score updating routine, providing as input to said score updating routine a normalization scoring event indicator comprising an event score value corresponding to zero and a event time indicator corresponding to $t_{OBSERVE}$.

20. A computing apparatus comprising:
    a processor and a memory including instructions that, when executed by the processor, perform a method comprising:
    defining a score updating routine comprising steps a-h:
    a. obtaining a scoring event indicator associated with a entity identifier, said scoring event indicator comprising an event score value ("Q") and an event time indicator ("$t_{EVENT}$") relative to a base time indicator ("$t_0$");
    b. obtaining a first temporally-globalized score value ("$LogS_1$") associated with said entity identifier, wherein $LogS_1$ is relative to $t_0$ and a first predetermined exponential scaling period constant ("$h_1$");
    c. obtaining a first temporally-localized score value ("$S_1$") associated with said entity identifier, wherein $S_1$ is relative to $h_1$ and a last time value ("$t_{LAST}$"), $t_{LAST}$ indicating a number of time units relative to $t_0$ at which $LogS_1$ was previously updated;
    d. computing a first exponential scaling factor in accordance with $h_1$ and a time offset magnitude corresponding to $t_{EVENT}$ and $t_{LAST}$;
    e. computing an updated first temporally-localized score ("$S_{NEW1}$") in accordance with said first exponential scaling factor, Q, and $S_1$; and f. determining an updated last time value ("$t_{NEW}$") corresponding to the later of $t_{EVENT}$ and $t_{LAST}$;
g. computing an updated first temporally-globalized score ("$LogS_{NEW1}$") in accordance with:
   i) a log value corresponding to $S_{NEW1}$; and
   ii) a time-inflation addend corresponding to $t_{NEW}$ and $h_1$; and
h. associating $LogS_{NEW1}$ and $t_{NEW}$ with said entity identifier within a first list of entity identifiers, each member of said first list having:
   i) an associated last time value relative to $t_0$; and
   ii) an associated first temporally-globalized score value relative to $h_1$ and $t_0$, and wherein said first list is ordered according to said first temporally-globalized score values respectively associated with each member of said first list;
performing said score updating routine, providing as input to said score updating routine a first scoring event indicator associated with a first entity identifier, said first event indicator comprising a first event score value and a first event time indicator relative to $t_0$;

obtaining, at an observation time value "$t_{OBSERVE}$") a plurality of highest-scoring entity identifiers by retrieving a plurality of entity identifiers from the top of said first list; and
for each of said plurality of highest-scoring entity identifiers:
   obtaining $LogS_1$ associated with said entity identifier $LogS_1$ being relative to $t_0$ and $h_1$;
   normalizing $LogS_1$ relative to $t_{OBSERVE}$ and $h_1$ ("$S_{OBSERVE}$"); and
   providing $S_{OBSERVE}$ for display to an output device;
   wherein normalizing $LogS_1$ relative to $t_{OBSERVE}$ and $h_1$ comprises performing said score updating routine, providing as input to said score updating routine a normalization scoring event indicator comprising an event score value corresponding to zero and a event time indicator corresponding to $t_{OBSE}$.

\* \* \* \* \*